United States Patent [19]

Cozewith et al.

[11] Patent Number: 4,786,697

[45] Date of Patent: Nov. 22, 1988

[54] MOLECULAR WEIGHT DISTRIBUTION MODIFICATION IN A TUBULAR REACTOR

[75] Inventors: Charles Cozewith, Westfield; Shiaw Ju, Edison; Gary W. Verstrate, Matawan, all of N.J.

[73] Assignee: Exxon Research & Engineering Co., Florham Park, N.J.

[21] Appl. No.: 46,667

[22] Filed: May 4, 1987

Related U.S. Application Data

[63] Continuation of Ser. No. 681,951, Dec. 14, 1984, abandoned, which is a continuation-in-part of Ser. No. 504,582, Jun. 14, 1983, Pat. No. 4,540,753.

[51] Int. Cl.$^4$ .......................... C08F 2/00; C08F 10/00
[52] U.S. Cl. ........................................ 526/88; 526/64; 526/66; 526/67; 526/72; 526/169.2; 526/280; 526/348; 526/348.2; 526/918; 526/922; 525/197; 525/240; 525/236; 525/52; 525/53; 252/43
[58] Field of Search .................. 526/64, 66, 67, 88, 526/72, 169.2, 280, 918, 922, 348, 348.2

[56] References Cited

U.S. PATENT DOCUMENTS

| | | | |
|---|---|---|---|
| 3,380,978 | 4/1965 | Ryan et al. | 260/88.2 |
| 3,454,675 | 3/1966 | Scoggin | 260/878 |
| 3,625,658 | 12/1971 | Closon | 23/285 |
| 3,879,494 | 4/1975 | Milkovich et al. | 260/876 |
| 3,884,993 | 5/1975 | Gros | 260/897 |
| 4,016,342 | 4/1977 | Wagensommer | 526/65 |
| 4,306,041 | 12/1981 | Cozewith et al. | 526/65 |
| 4,414,369 | 11/1983 | Kuroda et al. | 526/65 |

FOREIGN PATENT DOCUMENTS

| | | |
|---|---|---|
| 0060609 | 1/1982 | European Pat. Off. . |
| 0059034 | 2/1982 | European Pat. Off. . |
| 1233599 | 5/1971 | United Kingdom . |

OTHER PUBLICATIONS

E. Junghanns, A. Gumboldt and G. Bier, "Polymerization of Ethylene and Propylene to Amorphous Copolymers with Catalysts of Vanadium Oxychloride and Alkyl Aluminum Halides," *Makromol. Chem.*, vol. 58, pp. 18-62, 1962.

J. F. Wehner, "Laminar Flow Polymerization of EPDM Polymer", ACS Symposium Series 65 (1978), pp. 140-152.

Y. Mitsuda, J. Schrag, and J. Ferry, "Estimation of Long-Chain Branching in Ethylene-Propylene Terpolymers from Infinite-Dilution Viscoelastic Properties", *J. Appl. Pol. Sci.*, 18, 193 (1974).

C. K. Shih, "The Effect of Molecular Weight and Molecular Weight Distribution on the Non-Newtonian Behavior of Ethylene-Propylene-Diene Polymers, *Trans. Soc. Rheol.*, 14, 83 (1970).

G. W. Phillips and W. L. Carrick, "Transition Metal Catalysts, IX. Random Ethylene-Propylene Copolymers with Low Pressure Polymerization Catalysts," *J. Am. Chem. Soc.*, 84, 920-925 (1962).

G. Natta, G. Crespi, A. Valvassori, G. Sartori, *Rubber Chemistry and Technology*, 36 1608 (1963).

C. Cozewith and G. VerStrate, *Macromolecules*, 4, 482 (1971).

*Primary Examiner*—C. Warren Ivy
*Assistant Examiner*—Alex H. Walker
*Attorney, Agent, or Firm*—S. H. Markowitz; W. G. Muller

[57] ABSTRACT

Polymodal MWD ethylene copolymer comprising at least two modes of differing molecular weights. Each mode has at least one of $\overline{M}_w/\overline{M}_n$ of less than 2.0, and a $\overline{M}_z/\overline{M}_w$ of less than 1.8. The polymodal character of the copolymer is achieved by either (1) withdrawing polymer modes from the reactor from at least one takeoff port, and blending such modes with the reactor effluent, or (2) utilizing at least two catalyst species in the reaction to produce modes of differing molecular weights.

24 Claims, 4 Drawing Sheets

POLYMODAL MWD POLYMERS OF NARROW MWD MODES

MOLECULAR WEIGHT DISTRIBUTION MODIFICATION IN A TUBULAR REACTOR

CROSS REFERENCE TO RELATED APPLICATIONS

This is a continuation of application Ser. No. 681,951, filed Dec. 14, 1981, now abandoned, which is a continuation-in-part of application Ser. No. 504,582 filed June 15, 1983, now U.S. Pat. No. 4,540,753.

BACKGROUND OF THE INVENTION

The present invention relates to novel copolymers of alpha-olefins. More specifically, it relates to novel copolymers of ethylene with other alpha-olefins comprised of copolymer chains with compositions which are intramolecularly heterogeneous and intermolecularly homogeneous, as well as to a process for making these copolymers and their use in elastomer applications. In particular, it relates to polymers having a polymodal molecular weight distribution wherein individual modes of the polymer comprise narrow molecular weight distributions copolymer chains with compositions which are intramolecularly heterogeneous and intermolecularly homogeneous.

For convenience, certain terms that are repeated throughout the present specification are defined below:

A. Inter-CD defines the compositional variation, in terms of ethylene content, amond polymer chains. It is expressed as the minimum deviation (analogous to a standard deviation) in terms of weight percent ethylene from the average ethylene composition for a given copolymer sample needed to include a given weight percent of the total copolymer sample which is obtained by excluding equal weight fractions from both ends of the distribution. The deviation need not be symmetrical. When expressed as a single number, for example, 15% Inter-CD, it shall mean the larger of the positive or negative deviations. For example, for a Gaussian compositional distribution, 95.5% of the polymer is within 20 wt % ethylene of the mean if the standard deviation is 10%. The Inter-CD for 95.5 wt % of the polymer is 20 wt % ethylene for such a sample.

b. Intra-CD is the compositional variation, in terms of ethylene, within a copolymer chain. It is expressed as the minimum difference in weight (wt) % ethylene that exists between two portions of a single copolymer chain, each portion comprising at least 5 wt% of the chain.

c. Molecular weight distribution (MWD) is a measure of the range of molecular weights within a given copolymer sample. It is characterized in terms of at least one of the ratios of weight average to number average molecular weight, $M_w/M_n$, and Z average to weight average molecular weight, $M_z/M_w$, where:

$$M_w = \frac{\Sigma N_i M_i^2}{\Sigma N_i M_i}$$

$$M_n = \frac{\Sigma N_i M_i}{\Sigma N_i}, \text{ and}$$

$$M_z = \frac{\Sigma N_i M_i^3}{\Sigma N_i M_i^2}, \text{ wherein}$$

$N_i$ is the number of molecules of weight $M_i$.

d. Viscosity Index (V.I.) is the ability of a lubricating oil to accommodate increases in temperature with a minimum decrease in viscosity. The greater this ability, the higher the V.I.

Ethylene-propylene copolymers, particularly elastomers, are important commercial products. Two basic types of ethylene-propylene copolymers are commercially available. Ethylene-propylene copolymers (EPM) are saturated compounds requiring vulcanization with free radical generators such as organic peroxides. Ethylene-propylene terpolymers (EPDM) contain a small amount of non-conjugated diolefin, such as dicyclopentadience; 1,4-hexadiene or ethylidene norbornene, which provides sufficient unsaturation to permit vulcanization with sulfur. Such polymers that include at least two monomers, i.e., EPM and EPDM, will hereinafter be collectively referred to as copolymers.

These copolymers have outstanding resistance to weathering, good heat aging properties and the ability to be compounded with large quantities of fillers and plasticizers resulting in low cost compounds which are particularly useful in automotive and industrial mechanical goods applications. Typical automotive uses are tire sidewalls, inner tubes, radiator and heater hose, vacuum tubing, weather stripping and sponge doorseals and Viscosity Index (V.I.) improvers for lubricating oil compositions. Typical mechanical goods uses are for appliance, industrial and garden hoses, both molded and extruded sponge parts, gaskets and seals and conveyor belt covers. These copolymers also find use in adhesives, appliance parts as in hoses and gaskets, wire and cable and plastics blending.

As can be seen from the above, based on their respective properties, EPM and EPDM find many, varied uses. It is known that the properties of such copolymers which make them useful in a particular application are, in turn, determined by their composition and structure. For example, the ultimate properties of an EPM or EPDM copolymer are determined by such factors as composition, compositional distribution, sequence distribution, molecular weight, and molecular weight distribution (MWD).

The efficiency of peroxide curing depends on composition. As the ethylene level increases, it can be shown that the "chemical" crosslinks per peroxide molecule increases. Ethylene content also influences the rheological and processing properties, because crystallinity, which acts as physical crosslinks, can be introduced. The crystallinity present at very high ethylene contents may hinder processability and may make the cured product too "hard" at temperatures below the crystalline melting point to be useful as a rubber.

Milling behavior of EPM or EPDM copolymers varies radically with MWD. Narrow MWD copolymers crumble on a mill, whereas broad MWD materials will band under conditions encountered in normal processing operations. At the shear rates encountered in processing equipment, broader MWD copolymer has a substantially lower viscosity than narrower MWD polymer of the same weight average molecular weight or low strain rate viscosity.

Thus, there exists a continuing need for discovering polymers with unique properties and compositions. This is easily exemplified with reference to the area of V.I. improvers for lubricating oils.

For elastomer applications the processibility is often measured by the Mooney viscosity. The lower this quantity the easier the elastomer is to mix and fabricate. It is desirable to have low Mooney yet to maintain a high number average molecular weight Mn so that the polymers form good rubber network upon cross-linking. For EP and EPDM narrowing, the molecular weight distribution results in the production of polymer with higher number average molecular weight at a given Mooney. In certain cases, the poor milling or calendering or extrusion behavior that results from the narrow MWD must be ameliorated. Rather than perform a MWD broadening which includes low molecular weight components which reduce Mn, it is possible to broaden the MWD without disproportionately lowering Mn. This is done by superposing one or more narrow MWD modes, i.e., different Mooney components, each of which contains no low molecular weight polymer. The result is a polymodal molecular weight distribution comprised of narrow MWD polymer fractions of different molecular weights.

The present invention is drawn to a novel copolymer of ethylene and at least one other alpha-olefin monomer which copolymer is intramolecularly heterogeneous and intermolecularly homogeneous. Furthermore, it is composed of several such components, the MWD of each which is very narrow. It is well known that the breath of the MWD can be characterized by the ratios of various molecular weight averages. For example, an indication of the narrow MWD of each component in accordance with the present invention is that the ratio of weight to number average molecular weight ($\overline{M}_w/\overline{M}_n$) is less than 2. Alternatively, a ratio of the Z-average molecular weight to the weight average molecular weight ($\overline{M}_z/\overline{M}_w$) of less than 1.8 typifies a narrow MWD in accordance with the present invention. It is known that the property advantages of copolymers in accordance with the present invention are related to these ratios. Small weight fractions of material can disproportionately influence these ratios while not significantly altering the property advantages which depend on them. For instance, the present of a small weight fraction (e.g., 2%) of low molecular weight copolymer can depress $\overline{M}_n$, and thereby raise $\overline{M}_w/\overline{M}_n$ above 2 while maintaining $\overline{M}_z/\overline{M}_w$ less than 1.8. Therefore, polymers, in accordance with the present invention, are characterized by having at least one of $\overline{M}_w/\overline{M}_n$ less than 2 and $\overline{M}_z/\overline{M}_w$ less than 1.8. The copolymer comprises chains within which the ratio of the monomers varies along the chain length. To obtain the intramolecular compositional heterogeneity and narrow MWD, the copolymers in accordance with the present invention are preferably made in a tubular reactor. It has been discovered that to produce such copolymers requires the use of numberous heretofore undisclosed method steps conducted within heretofore undisclosed preferred ranges. Accordingly, the present invention is also drawn to a method for making the novel copolymers of the present invention.

DESCRIPTION OF THE PRIOR ART

Representative prior art dealing with tubular reactors to make copolymers are as follows:

In "Polymerization of ethylene and propylene to amorphous copolymers with catalysts of vanadium oxychloride and alkyl aluminum halides"; E. Junghanns, A. Gumboldt and G. Bier; Makromol. Chem., v. 58 (12/12/62): 18-42, the use of a tubular reactor to produce ethylene-propylene copolymer is disclosed in which the composition varies along the chain length. More specifically, this reference discloses the production in a tubular reactor of amorphous ethylene-propylene copolymers using Ziegler catalysts prepared from vanadium compound and aluminum alkyl. It is disclosed that at the beginning of the tube ethylene is preferentially polymerized, and if no additional make-up of the monomer mixture is made during the polymerization the concentration of monomers changes in favor of propylene along the tube. It is further disclosed that since these changes in concentrations take place during chain propagation, copolymer chains are produced which contain more ethylene on one end than at the other end. It is also disclosed that copolymers made in a tube are chemically non-uniform, but fairly uniform as regards molecular weight distribution. Using the data reported in their FIG. 17 for copolymer prepared in the tube, it was estimated that the $\overline{M}_w/\overline{M}_n$ ratio for this copolymer was 1.6, and from their FIG. 18 that the intermolecular compositional dispersity (Inter-CD, explained in detail below) of this copolymer was greater than 15%.

"Laminar Flow Polymerization of EPDM Polymer"; J. F. Wehner; ACS Symposium Series 65 (1978); pp 140-152 discloses the results of computer simulation work undertaken to determine the effect of tubular reactor solution polymerization with Ziegler catalysts on the molecular weight, distribution of the polymer product. The specific polymer simulated was an elastomeric terpolymer of ethylene-propylene-1,4-hexadiene. On page 149, it is stated that since the monomers have different reactivities, a polymer of varying composition is obtained as the monomers are depleted. However, whether the composition varies inter-or intramolecularly is not distinguished. In Table III on page 148, various polymers having $\overline{M}_w/\overline{M}_n$ of about 1.3 are predicted. In the third paragraph on page 144, it is stated that as the tube diameter increases, the polymer molecular weight is too low to be of practical interest, and it is predicted that the reactor will plug. It is implied in the first paragraph on page 149 that the compositional dispersity produced in a tube would be detrimental to product quality.

U.S. Pat. No. 3,681,306 to Wehner is drawn to a process for producing ethylene/higher alpha-olefin copolymers having good processability, by polymerization in at least two consecutive reactor stages. According to this reference, this two-stage process provides a simple polymerization process that permits tailor-making ethylene/alpha-olefin copolymers having predetermined properties, particularly those contributing to processability in commercial applications such as cold-flow, high green strength and millability. According to this reference, the inventive process is particularly adapted for producing elastomeric copolymers, such as ethylene/propylene/5-ethylidene-2-norbornene, using any of the coordination catalysts useful for making EPDM. The preferred process uses one tubular reactor followed by one pot reactor. However, it is also disclosed that one tubular reactor could be used, but operated at different reaction donditions to simulate two stages. As is seen from column 2, lines 14-20, the inventive process makes polymers of broader MWD than those made in a single stage reactor. Although intermediate polymer from the first (pipeline) reactor is disclosed as having a ratio of $\overline{M}_w/\overline{M}_n$ of about 2, as disclosed in column 5, lines 54-57, the final polymers produced by the inventive process have an $\overline{M}_w/\overline{M}_n$ of 2.4 to 5.

U.S. Pat. No. 3,625,658 to Closon discloses a closed circuit tubular reactor apparatus with high recirculation rates of the reactants which can be used to make elastomers of ethylene and propylene. With particular reference to FIG. 1, a hinged support 10 for vertical leg 1 of the reactor allows for horizontal expansion of the bottom leg thereof and prevents harmful deformations due to thermal expansions, particularly those experienced during reactor clean out.

U.S. Pat. No. 4,065,520 to Bailey et al discloses the use of a batch reactor to make ethylene copolymers, including elastomers, having borad compositional distributions. Several feed tanks for the reactor are arranged in series, with the feed to each being varied to make the polymer. The products made have crystalline to semi-crystalline to amorphous regions and gradient changes in between. The catalyst system can use vanadium compounds alone or in combination with titanium compound and is exemplified by vanadium oxy-trichloride and diisobutyl aluminum chloride. In all examples titanium compounds are used. In several examples hydrogen and diethyl zinc, known transfer agents, are used. The polymer chains produced have a compositionally disperse first length and uniform second length. Subsequent lengths have various other compositional distributions.

In "Estimation of Long-Chain Branching in Ethylene-Propylene Terpolymers from Infinite-Dilution Viscoelastic properties", Y. Mitsuda, J. Schrag, and J. Ferry; *J. Appl. Pol. Sci.*, 18, 193 (1974) narrow MWD copolymers of ethylenepropylene are disclosed. For example, in TABLE II on page 198, EPDM copolymers are disclosed which have $\overline{M}_w/\overline{M}_n$ of from 1.19 to 1.32.

In "The Effect of Molecular Weight and Molecular Weight distribution on the Non-Newtonian Behavior of Ethylene-Propylene-Diene Polymers; *Trans. Soc. Rheol.*, 14, 83 (1970); C. K. Shih, a whole series of compositionally homogeneous fractions were prepared and disclosed. For example, the data in TABLE I discloses polymer Sample B having a high degree of homogeneity. Also, based on the reported data, the MWD of the sample is very narrow. However, the polymers are not disclosed as having intramolecular dispersity.

Molecular weight distribution (MWD) is a very important characteristic of ethylene-propylene copolymers and terpolymers. Favorable distributions result in polymers which can have both faster cures and better processing characteristics. An optimum combination of these properties is achieved where the polymers have a bimodal molecular weight distribution and a bimodal compositional distribution.

A significant amount of effort has been expended by the polymer industry in an attempt to produce such bimodal ethylene-propylene polymers. Generally, these efforts have been directed toward physical blends of polymers having different MWD or by sequential polymerization in a multiple reactor system. For example, a polymerization is carried out in a first reaction stage to produce a polymer of a particular MWD and composition with a subsequent polymerization in a second reactor stage to produce a polymer of a different MWD from that of the first stage and, if desired, of a different monomer composition. Representative prior art dealing with the preparation of bimodal MWD ethylene-propylene copolymers are as follows:

British Pat. No. 1,233,599 is illustrative of this two stage polymerization process. While copolymers of ethylene are disclosed, the examples and disclosure are directed toward polyethylene homopolymers and crystalline copolymers, e.g., 95% ethylene. The preferred catalysts are vanadium compounds such as vanadyl halide, vanadium tetrachloride or vanadium tris-(acetylacetibate) in conjunction with an aluminum compound, e.g., $Br_2AlCH_2Br_2$. The different MWDs are obtained by using differing amounts of hydrogen in the first and second stage polymerization.

U.S. Pat. No. 4,078,131 discloses an ethylene-propylene rubber composition having a bimodal distribution in molecular weights comprising two polymer fractions each having a wide distribution of molecular weights and a monomer composition different from that of the other principal fractions. The polymers are further characterized in that they are formed of: (a) a first principal fraction comprising from about 30% to about 85% (by weight referred to the total weight of elastomers) of molecular weight fractions having an intrinsic viscosity distribution of from about 0.2 to about 3, and average intrinsic viscosity between about 0.8 to about 1.5, an average propylene content between about 36 to about 52% by weight, and a termonomer content of between 0% and about 5%, and of (b) a second fraction comprising about 70% to about 15% of weight of molecular weight fractions having an intrinsic viscosity distribution from about 3 to about 15, an average intrinsic viscosity of about 3.5 to about 7, and average propylene content of between about 26% to about 32% by weight and a termonomer content of about 0 to about 5%.

The polymers are prepared by carrying out polymerization in two separate reactors connected in series. The catalyst systems utilized include organic and inorganic component of a transition metal of Group 4A to 8A of the Mendeleev periodic table of the elements, e.g., $VOCl_3$, $VCl_4$, vanadium esters and acetyl acetonates. Co-catalysts include organoaluminum compounds or mixtures of compounds, e.g., aluminum alkyls.

U.S. Pat. No. 3,681,306 discloses a two stage polymerization process for the preparation ethylene-propylene co-and terpolymers. In one embodiment the first stage is a "pipe reactor" and the second stage is a backmixed pot reactor. The polymerization is carried out so that the average ethylene/alpha olefin ratio in one stage is at least 1.3 times the average ratio of the other stage. Any of the coordination catalysts known to be useful in producing EPDM polymers is said to be effective for the process.

U.S. Pat. No. 4,259,468 discloses a broad molecular weight ethylene-propylene-diene rubber prepared using as a catalyst (a) the alcohol reaction product of vanadium oxytrichloride and (b) a mixture of aluminum sesquichloride and ethylaluminum dichloride. The polymer is characterized in that the higher molecular weight fraction contains a larger proportion of the diene than does the lower molecular weight fraction. The polymer has an intrinsic viscosity of about 1.0 to about 6.0 dl/g and a weight average molecular weight-/number ratio of about 3 to about 15.

U.S. Pat. No. 4,306,041 discloses a method of manufacture of EPDM type terpolymers which utilizes a two stage polymerization process. Substantially all of the non-conjugated diene monomer is fed to the first stage thereby producing a polymer having a non-uniform diene content.

It has been shown that selecting the appropriate support for titanium based Ziegler catalysts can result in the single stage polymerization of ethylene propylene polymer have a broad molecular weight distribution, e.g., $TiCl_4$ supported on aluminosilicate; see A.G. Rodinov, et al., Vysokomal, soyed A23: No. 7, 1560–1567, 1981.

A 1962 study alleges that soluble Ziewgler catalysts tend to give EP polymers having uniform monomer distribution as a function of molecular weight. Heterogeneous TiCl$_4$–AlEt$_3$, on the other hand, gives a broad distribution. See G. W. Philips and W. L. Carrick, "Transition Metal Catalysts, IX. Random Ethylene-Propylene Copolymers with Low Pressure Polymerization Catalysts,-" *J. Am. Chem. Soc.*, 84, 920–925, 1962.

In the polymerization of ethylene-propylene polymers it has been demonstrated that different catalysts give different EP reactivity ratios. See G. Natta, G. Crespi, A. Valvassori, G. Sartori, *Rubber Chemistry and Technology*, 36 1608 (1963).

C. Cozewith and G. Ver Strate, *Macromolecules*, 4, 482 (1971). Cozewith and Ver Strate have determined the reactivity ratios $R_{ethylene}$ and $R_{propylene}$ for the system VOCl$_3$/EASC to be 10.1 and 0.025 respectively. A co-worker in an unpublished memorandum disclosed that the $R_{ET}$ and $RP_r$ for VCl$_4$/EASC was found to be 3.91 and 0.224 respectively.

BRIEF DESCRIPTION OF THE DRAWINGS

The accompanying drawings depict, for illustration purposes only, processes embodied by the present invention, wherein.

DETAILED DESCRIPTION OF THE INVENTION

Figure 1:
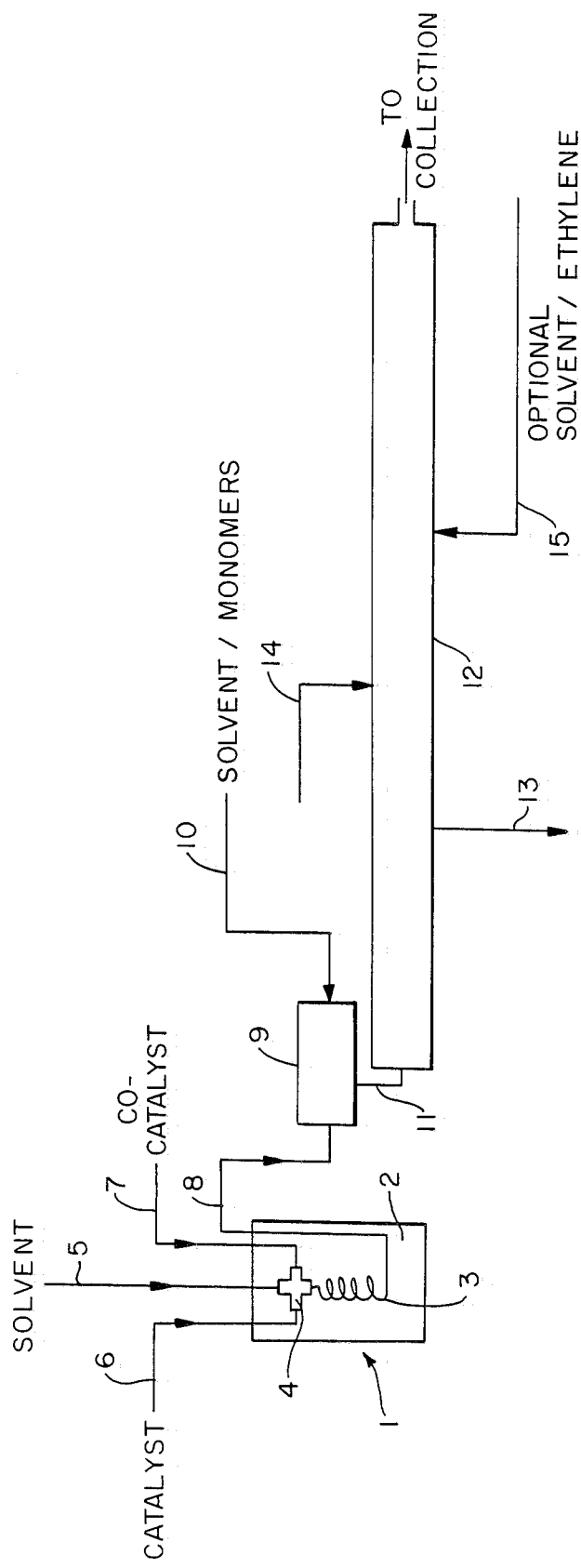
FIG. 1 is a schematic representation of a process for producing polymer in accordance with the present invention, FIG. 2 schematically illustrates a polymodal MWD polymer comprising narrow MWD polymers for each mode.
Figure 2:
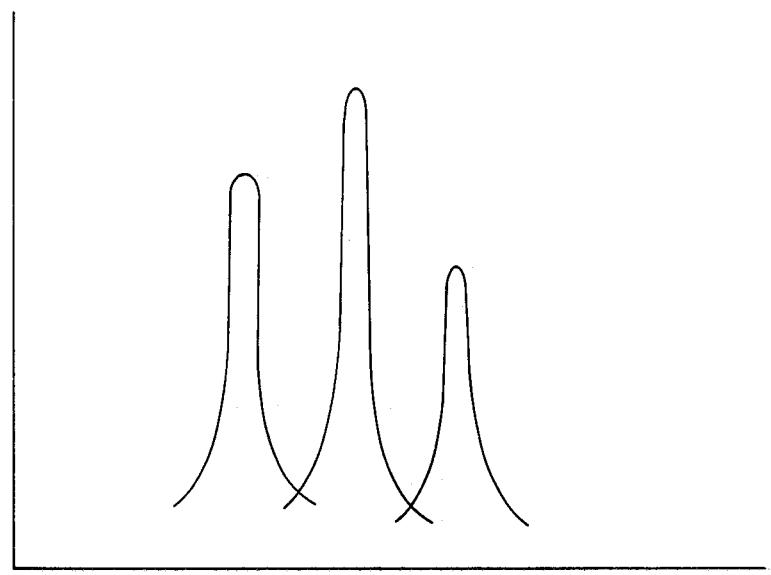

As already noted above, the present invention is drawn to novel copolymer of ethylene and at least one other alpha-olefin monomer, which copolymer is a superposition of two or more copolymers, each of which is intramolecularly homogeneous and has an MWD characterized by at least one of $\overline{M}_w/\overline{M}_n$ of less than 2 and $\overline{M}_z/\overline{M}$phd w of less than 1.8. More specifically, the individual component copolymers in accordance with the present invention comprises intramolecularly heterogeneous chains wherein at least two portions of an individual intramolecularly heterogeneous chain, each portion comprising at least 5 wt % of the chain, differ in composition from one another by at least 5 wt % ethylene, wherein the intermolecular compositional dispersity of the polymer is such at 95 wt % of the polymer chains have a composition 15% or less different in ethylene from the average weight percent ethylene composition, and wherein the copolymer is characterized by at least one of a ration of $\overline{M}_w/\overline{M}HD$ n of less than 2 and a ratio of $\overline{M}_z/\overline{M}_w$ of less than 1.8.

Since the present invention is considered to be most preferred in the context of ethylene-propylene (EPM) or ethylene-propylene-diene (EPDM) copolymers, it will be described in detail in the context of EPM and/or EPDM.

Copolymer in accordance with the present invention is preferably made in a tubular reactor. When produced in a tubular reactor with monomer feed only at the tube inlet, it is known that at the beginning of the tubular reactor ethylene, due to its high reactivity, will be preferentially polymerized. However, the concentration of monomers changes along the tube in favor of propylene as the ethylene is depleted. The result is component copolymer chains which are higher in ethylene concentration in the chain segments grown near the reactor inlet (as defined at the point at which the polymerization reaction commences), and higher in propylene concentration in the chain segments formed near the reactor outlet. An illustrative copolymer chain of ethylene-propylene is schematically presented below with E representing ethylene constituents and P representing propylene constituents in the chain:

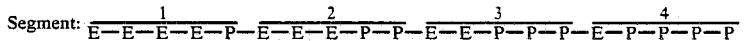

Segment: 1 E—E—E—E—P— 2 E—E—E—P—P— 3 E—E—P—P—P— 4 E—P—P—P—P

As can be seen from this illustrative schematic chain, the far left-hand segment (1) thereof represents that portion of the chain formed at the reactor inlet where the reaction mixture is proportionately richer in the more reactive constituent ethylene. This segment comprises four ethylene molecules and one propylene molecule. However, as subsequent segments are formed from left to right with the more reactive ethylene being depleted and the reaction mixture proportionately increasing in propylene concentration, the subsequent chain segments become more concentrated in propylene. The resulting chain is intramolecularly heterogeneous.

In the event that more than two monomers are used, e.g., in the production of EPDM using a diene termonomer, for purposes of describing the present invention all properties related to homogeneity and heterogeneity will refer to the relative ratio of ethylene to the other monomers in the chain. The property, of the copolymer discussed herein, related to intramolecular compositional dispersity (compositional variation within a chain) shall be referred to as Intras-CD, and that related to intermolecular compositional disperisty (compositional variation between chains) shall be referred to as Inter-CD.

For copolymers in accordance with the present invention, composition can vary between chains as well as along the length of the chain. The Inter-CD can be characterized by the difference in composition between some fraction of the copolymer and the average composition, as well as by the total difference in composition between the copolymer fractions containing the highest and lowest quantity of ethylene. Techniques for measuring the breadth of the Intra-CD are known as illustrated by Junghanns, et al., wherein a p-xylene-dimethylformamide solvent/non-solvent was used to fractionate copolymer into fractions of differing intermolecular composition. Other solvent/non-solvent systems can be used, such as hexane-2-propanol, as will be discussed in more detail below.

The Inter-CD of the individual component copolymers in accordance with the present invention is such that 95 wt % of the copolymer chains have an ethylene composition that differs from the average component weight percent ethylene composition by 15 wt % or less. The preferred Inter-CD is about 13% or less, with the most preferred being about 10% or less. In comparison, Junghanns, et al., found that their tubular reactor copolymer had an Inter-CD of greater than 15 wt %.

Broadly, the Intra-CD of copolymer in accordance with the present invention is such that at least two portions of an individual component intramolecularly heterogeneous chain, each portion comprising at least 5 wt % of the chain, differ in composition from one another by at least 5 wt % ethylene. Unless otherwise indicated, this property of Intra-CD as referred to herein is based upon at least two 5 wt % portions of copolymer chain. The Intra-CD of copolymer in accordance with the present invention can be such that at least two portions of copolymer chain differ by at least 10 wt % ethylene. Differences of at least 20 wt %, as well as of at least 40 wt % ethylene are also considered to be in accordance with the present invention.

The experimental procedure for determining Intra-CD is as follows. First, the Inter-CD is established as described below, then the polymer chain is broken into fragments along its contour and the Inter-CD of the fragments is determined. The difference in the two results is due to Intra-CD as can be seen in the illustrative example below.

Consider a heterogeneous sample polymer containing 30 monomer units. It consists of 3 molecules designated A, B, C.

A  EEEEPEEEPEEEPPEEPPEPPPEPPPPPPP

B  EEEEEPEEEPEEEPPEEEPPPEPPPEEPPP

C  EEPEEEPEEEPEEEPEEEPPEEPPPEEPPP

Molecule A is 36.8 wt % ethylene, B is 46.6%, and C is 50% ethylene. The average ethylene content for the mixture is 44.3%. For this sample the Inter-CD is such that the highest ethylene polymer contains 5.7% more ethylene than the average while the lowest ethylene content polymer contains 7.5% less ethylene than the average. Or, in other words, 100 wt % of the polymer is within +5.7% and −7.5% ethylene about an average of 44.3%. Accordingly, the Inter-CD is 7.5% when the given wt % of the polymer is 100%. The distribution may be represented graphically as by curve 1 in FIG. 3.

If the chains are broken into fragments, there will be a new Inter-CD. For simplicity, consider first breaking only molecule A into fragments shown by the slashes as follows:

EEEEP/EEEPE/EEPPE/EPPEP/-
PPEPP/PPPPP

Figure 3:
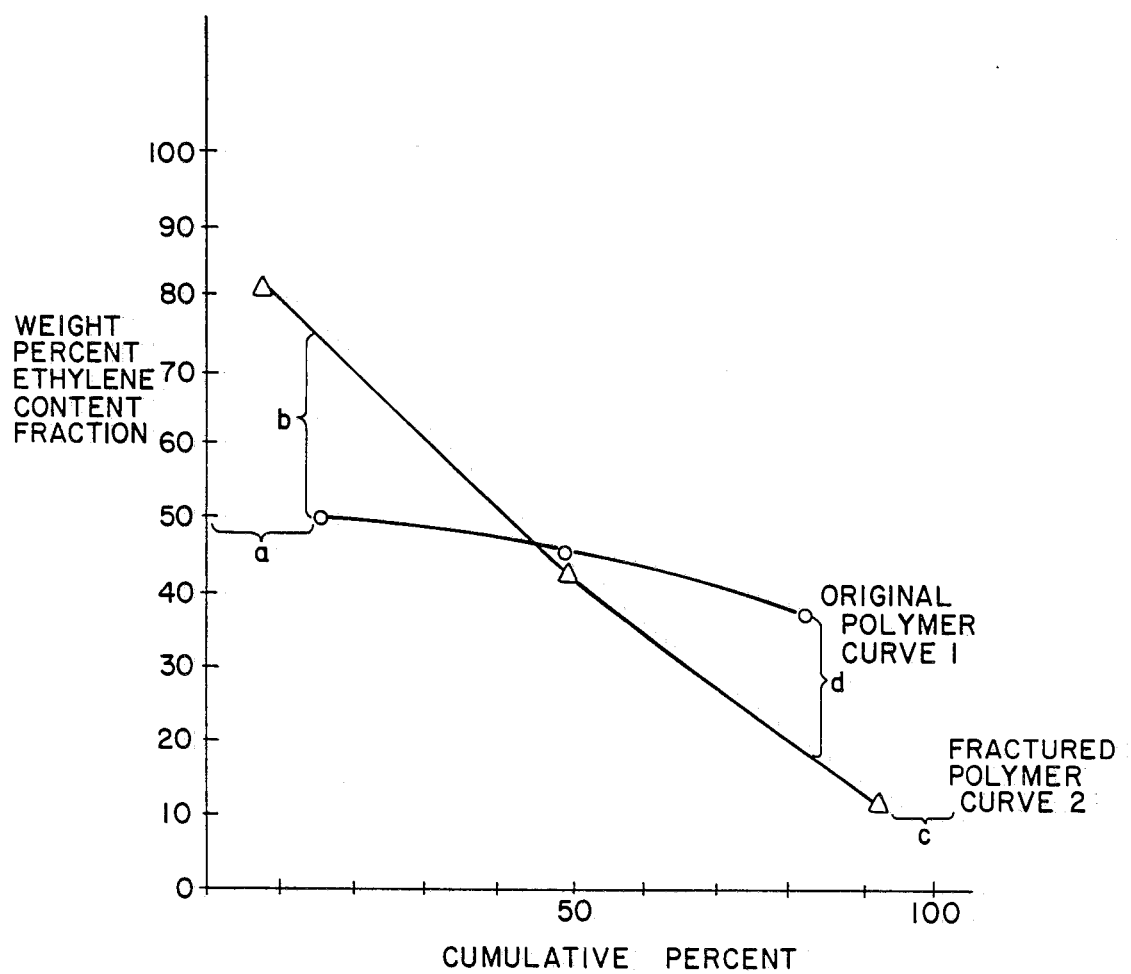
FIG. 3 is a graphical illustration of a technique for determining Intra-CD of a copolymer, FIG. 4 graphically illustrates various copolymer structures that can be attained using processes in accordance with the present invention.

Portions of 72.7%, 72.7%, 50%, 30.8%, 14.3% and 0% ethylene are obtained. If molecules B and C are similarly broken and the weight fractions of similar composition are grouped the new Inter-CD shown by curve 2 in FIG. 3 is obtained. The difference between the two curves in the figure is due to Intra-CD.

Consideration of such data, especially near the end point ranges, demonstrates that for this sample at least 5% of the chain contour represented by the cumulative weight % range (a) differs in composition from another section by at least 15% ethylene shown as (b), the difference between the two curves. The difference in composition represented by (b) cannot be intermolecular. If it were, the separation process for the original polymer would have revealed the higher ethylene contents seen only for the degraded chain.

The compositional differences shown by (b) and (d) in the figure between original and fragmented chains give minimum values for Intra-CD. The Intra-CD must be at least that great, for chain sections have been isolated which are the given difference in composition (b) or (d) from the highest or lowest composition polymer isolated from the original. We know in this example that the original polymer represented at (b) had sections of 72.71% ethylene and 0% ethylene in the same chain. It is highly likely that due to the inefficiency of the fractionation process any real polymer with Intra-CD examined will have sections of lower or higher ethylene connected along its contour than that shown by the end points of the fractionation of the original polymer. Thus, this procedure determines a lower bound for Intra-CD. To enhance the detection, the original whole polymer can be fractionated (e.g., separate molecule A from molecule B from molecule C in the hypothetical example) with these fractions refractionated until they show no (or less) Inter-CD. Subsequent fragmentation of this inter-molecularly homogeneous fraction now reveals the total Intra-CD. In principle, for the example, if molecule A were isolated, fragmented, fractionated and analyzed, the Intra-CD for the chain sections would be 72.7−0%=72.7% rather than 72.7−50%=22.7% seen by fractionating the whole mixture of molecules A, B and C.

In order to determine the fraction of a polymer which is intramolecularly heterogeneous in a mixture of polymers combined from several sources or as several modes in the case described here, the mixture must be separated into fractions which show no further heterogenity upon subsequent fractionation. These fractions are subsequently fractured and fractionated to reveal which are heterogeneous.

The fragments into which the original polymer is broken should be large enough to avoid end effects and to give a reasonable opportunity for the normal statistical distribution of segments to form over a given monomer conversion range in the polymerization. Intervals of ca 5 wt % of the polymer are convenient. For example, at an average polymer molecular weight of about $10^5$, fragments of ca 5000 molecular weight are appropriate. A detailed mathematical analysis of plug flow or batch polymerization indicates that the rate of change of composition along the polymer chain contour will be most severe at high ethylene conversions near the end of the polymerization. The shortest fragments are needed here to show the low propylene content sections.

The best available technique for determination of compositional dispersity for non-polar polymers is solvent/non-solvent fractionation which is based on the thermodynamics of phase separation. This technique is described in "Polymer Fractionation," M. Cantow editor, Academic 1967, p. 341 ff and in H. Inagaki, T. Tanaku, *Developments in Polymer Characterization*, 3, 1 (1982). These are incorporated herein by reference.

For non-crystalline copolymers of ethylene and propylene, molecular weight governs insolubility more than does composition in a solvent/non-solvent solution. High molecular weight polymer is less soluble in a given solvent mix. Also, there is a systematic correlation of molecular weight with ethylene content for the polymers described herein. Since ethylene polymerizes much more rapidly than propylene, high ethylene polymer also tends to be high in molecular weight. Additionally, chains rich in ethylene tend to be less soluble in hydrocarbon/polar non-solvent mixtures than propylene-rich chains. Thus the high molecular weight, high ethylene chains are easily separated on the basis of thermodynamics.

A fractionation procedure is as follows: Unfragmented polymer is dissolved in n-hexane at 23° C. to form ca a 1% solution (1 g polymer/100 cc hexane). Isopropyl alcohol is titrated into the solution until turbidity appears at which time the precipitate is allowed to settle. The supernatant liquid is removed and the precipitate is dried by pressing between Mylar ® (polyethylene terphthalate) film at 150° C. Ethylene content is determined by ASTM method D-3900. Titration is resumed and subsequent fractions are recovered and analyzed until 100% of the polymer is collected. The titrations are ideally controlled to produce fractions of 5–10% by weight of the original polymer especially at the extremes of composition.

To demonstrate the breadth of the distribution, the data are plotted as % ethylene versus the cumulative weight of polymer as defined by the sum of half the weight % of the fraction of that composition plus the total weight % of the previously collected fractions.

Another portion of the original polymer is broken into fragments. A suitable method for doing this is by thermal degradation according to the following procedure: In a sealed container in a nitrogen-purged oven, a 2 mm thick layer of the polymer is heated for 60 minutes at 330° C. This should be adequate to reduce a $10^5$ molecular weight polymer to fragments of ca 5000 molecular weight. Such degradation does not change the average ethylene content of the polymer. This polymer is fractionated by the same procedure as the high molecular weight precursor. Ethylene content is measured, as well as molecular weight on selected fractions.

Ethylene content is measured by ASTM-D3900 for ethylene-propylene copolymers between 35 and 85 wt. % ethylene. Above 85% ASTM-D2238 can be used to obtain methyl group concentrations which are related to percent ethylene in an unambiguous manner for ethylene-propylene copolymers. When comonomers other than propylene are employed no ASTM tests covering a wide range of ethylen contents are available, however, proton and carbon 13 nuclear magnetic resonance can be employed to determine the composition of such polymers. These are absolute techniques requiring no calibration when operated such that all nucleii contribute equally to the spectra. For ranges not covered by the ASTM tests for ethylene-propylene copolymers, these nuclear magnetic resonance methods can also be used.

Molecular weight and molecular weight distribution are measured using a Waters 150 gel permeation chromatograph equipped with a Chromatix KMX-6 on-line light scattering photometer. The system is used at 135° C. with 1,2,4 trichlorobenzene as mobile phase. Showdex (Showa-Denko America, Inc.) polystyrene gel columns 802, 803, 804 and 805 are used. This technique is discussed in "Liquid Chromatography of Polymers and Related Materials III", J. Cazes editor. Marcel Dekkar, 1981, p. 207 (incorporated herein by reference). No corrections for column spreading are employed; however, data on generally accepted standards, e.g., National Bureau of Standards Polyethene 1484 and anionically produced hydrogenated polyisoprenes (an alternating ethylenepropylene copolymer) demonstrate that such corrections on $\overline{M}_w/\overline{M}_n$ or $\overline{M}_z/\overline{M}_w$ are less than 0.05 unit. $\overline{M}_w/\overline{M}_n$ is calculated from an elution time-molecular weight relationship whereas $\overline{M}_z/\overline{M}_w$ is evaluated using the light scattering photometer. The numerical analyses can be performed using the commercially available computer software GPC2, MOLWT2 available from LDC/Milton Roy-Riviera Beach, Fla.

As already noted, copolymers in accordance with the present invention are comprised of ethylene and at least one other alpha-olefin. It is believed that such alpha-olefins could include those containing 3 to 18 carbon atoms, e.g., propylene, butene-1, pentene-1, etc. Alpha-olefins of 3 to 6 carbons are preferred due to economic considerations. The most preferred copolymers in accordance with the present invention are those comprised of ethylene and propylene or ethylene, propylene and diene.

As is well known to those skilled in the art, copolymers of ethylene and higher alpha-olefins such as propylene often include other polymerizable monomers. Typical of these other monomers may be non-conjugated dienes such as the following non-limiting examples:

a. straight chain acyclic dienes such as: 1,4-hexaidne; 1,6-octadiene;
b. branched chain acyclic dienes such as: 5-methyl-1, 4-hexadiene; 3,7-dimethyl-1,6-octadiene; 3,7-dimethyl-1,7-octadiene and the mixed isomers of dihydro-myrcene and dihydroocinene;
c. single ring alicyclic dienes such as: 1,4-cyclohexadiene; 1,5-cyclooctadiene; and 1,5-cyclododecadiene;
d. multi-ring alicyclic fused and bridged ring dienes such as: tetrahydroindene; methyltetrahydroindene; dicyclopentadiene; bicyclo-(2,2,1)-hepta-2,5-diene; alkenyl, alkylidene, cycloalkenyl and cycloalkylidene norbornenes such as 5-methylene-2-norbornene (MNB), 5-ethylidene-2-norbornene (ENB), 5-(4-cyclopentenyl)-2-norbornene; 5-cyclohexylidene-2-norbornene.

Of the non-conjugated dienes typically used to prepare these copolymers, dienes containing at least one of the double bonds in a strained ring are preferred. The most preferred diene is 5-ethylidene-2-norbornene (ENB). The amount of diene (wt. basis) in the copolymer could be from about 0% to 20% with 0% to 15% being preferred. The most preferred range is 0% to 10%.

As already noted, the most preferred copolymer in accordance with the present invention is ethylene-propylene or ethylene-propylene-diene. In either event, the average ethylene content of the copolymer could be as low as about 10% on a weight basis. The preferred minimum is about 25%. A more preferred minimum is about 30%. The maximum ethylene content could be about 90% on a weight basis. The preferred maximum is about 85%, with the most preferred being about 80%.

The molecular weight of copolymer made in accordance with the present invention can vary over a wide range. It is believed that the weight average molecular weight could be as low as about 2,000. The preferred minimum is about 10,000. The most preferred minimum is about 20,000. It is believed that the maximum weight average molecular weight could be as high as about 12,000,000. The preferred maximum is about 1,000,000. The most preferred maximum is about 750,000.

Another feature of copolymer made in accordance with the present invention is that the molecular weight distribution (MWD) of each component is very narrow, as characterized by at least one of a ratio of $\overline{M}_w/\overline{M}_n$ of less than 2 and a ratio of $\overline{M}_z/\overline{M}_w$ of less than 1.8. As relates to EPM and EPDM, a typical advantage of such copolymers composed of several modes having narrow MWD is that when compounded and vulcanized, faster cure and better physical properties result than when copolymers having lower $\overline{M}_n$ for a given Mooney are used.

Processes in accordance with the present invention produce copolymer by polymerization of a reaction mixture comprised of catalyst, ethylene and at least one additional alpha-olefin monomer. Solution polymerizations are preferred.

Any known solvent for the reaction mixture that is effective for the purpose can be used in conducting solution polymerizations in accordance with the present invention. For example, suitable solvents would be hydrocarbon solvents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Most preferred are $C_{12}$ or lower, straight chain or branched chain hydrocarbons, particularly hexane. Non-limiting illustrative examples of solvents are butane, pentane, hexane, heptane, cyclopentane, cyclohexane, cycloheptane, methyl cyclopentane, methyl cyclohexane, isooctane, benzene, touene, xylene, chloroform, chlorobenzenes, tetrachloroethylene, dichloroethane and trichloroethane.

These processes may be carried out in a mixfree reactor system, which is one in which substantially no mixing occurs between portions of the reaction mixture that contain polymer chains initiated at different times. To produce the polymodal MWD polymers of this invention, the product is removed at one or more locations. Alternately, two or more catalysts with different propagation rates are used. Suitable reactors are a continuous flow tubular or a stirred batch reactor. A tubular reactor is well known and is designed to minimize mixing of the reactants in the direction of flow. As a result, reactant concentration will vary along the reactor length. In contrast, the reaction mixture in a continuous flow stirred tank reactor (CFSTR) is blended with the incoming feed to produce a solution of essentially uniform composition everywhere in the reactor. Consequently, the growing chains in a portion of the reaction mixture will have a variety of ages and thus a single CFSTR is not suitable for the process of this invention. However, it is well known that 3 or more stirred tanks in series with all of the catalyst fed to the first reactor can approximate the performance of a tubular reactor. Accordingly, such tanks in series are considered to be in accordance with the present invention. Alternately, a reactor in which limited discrete mixing is permitted may be used. In this case, several catalyst feeds are used, each comprising appropriately premixed components. The reactor is not truly mix free. However, mixing of chains which are initiated at different times is permitted only in a manner that discrete narrow MWD modes are produced. The term "limited discrete mix free reactor" as used in the specification and claims means a reactor which permits the aforedescribed limited discrete mixing.

The term "essentially mix free reactor" as used in the specification and claims means both mix free and limited discrete mix free reactors.

A batch reactor is a suitable vessel, preferably equipped with adequate agitation, to which the catalyst, solvent, and monomer are added at the start of the polymerization. The charge of reactants is then left to polymerize for a time long enough to produce the desired product. For economic reasons, a tubular reactor is preferred to a batch reactor for carrying out the processes of this invention.

In addition to the importance of the reactor system to make copolymers in accordance with the present invention, the polymerization should be conduced such that for each component or mode in the MWD:

a. the catalyst system produces essentially one active catalyst species, b. the reaction mixture is essentially free of chain transfer agents, and c. the polymer chains for each mode are essentially all initiated simultaneously, which is at the same time for a batch reactor or at the same point along the length of the tube for a tubular reactor.

The desired polymer can be obtained if additional solvent and reactants (e.g., at least one of the ethylene, alpha-olefin and diene) are added either along the length of a tubular reactor or during the course of polymerization in a batch reactor. Operating in this fashion may be desirable in certain circumstances to control the polymerization rate or polymer composition. However, it is necessary to add the catalyst at the inlet or specific locations of the tube or at the onset of or at specific times in batch reactor operation to meet the requirement that essentially all polymer chains are initiated simultaneously.

Accordingly, in on aspect of this invention, processes in accordance with the present invention are carried out:

(a) in a least one mix free reactor or limited discrete mixing reactor, (b) using catalyst systems that produce essentially one active catalyst species each, (c) using at least one reaction mixture which is essentially transfer agent-free, and (d) in such a manner and under conditions sufficient to initiate propagation of essentially all polymer chains of each discrete mode simultaneously.

(e) with drawing polymer fractions from the reactor after varying degrees of polymerization have been allowed to occur the effect of which is to cause the polymer to be composed of a blend of narrow MWD molecular weight.

By quenching polymerization after removal from the reactor and blending the polymer fractions a polymodal ethylene-propylene copolymer is produced, each fraction comprising copolymer chains with compositions which are intramolecularly heterogeneous and intermolecularly homogeneous.

In another embodiment of the invention steps (a) through (d) above are followed except that more than one catalyst species is utilized. The catalyst species are characterized by the fact that they do not interact with one another, and initiate polymer species of narrow MWD, but of different molecular weights. A preferred mixed catalyst system comprises $VCl_4/VOCl_3$ utilizing as a cocatalyst an alkyl aluminum sesquihalide. The catalyst system can be lewis base moderated. The resultant polymer is a bimodal MWD polymer.

Since the tubular reactor is the preferred reactor system for carrying out processes in accordance with the present invention, the following illustrative descriptions and examples are drawn to that system, but will apply to other reactor systems as will readily occur to the artisan having the benefit of the present disclosure.

In practicing processes in accordance with the present invention, use is preferably made of at least one tubular reactor. Thus, in its simplest form, such a process would make use of but a single reactor. However, as would readily occur to the artisan having the benefit of the present disclosure, more than one reactor could be used, either in parallel for economic reasons, or in series with multiple monomer feed to vary intramolecular composition.

Figure 4:
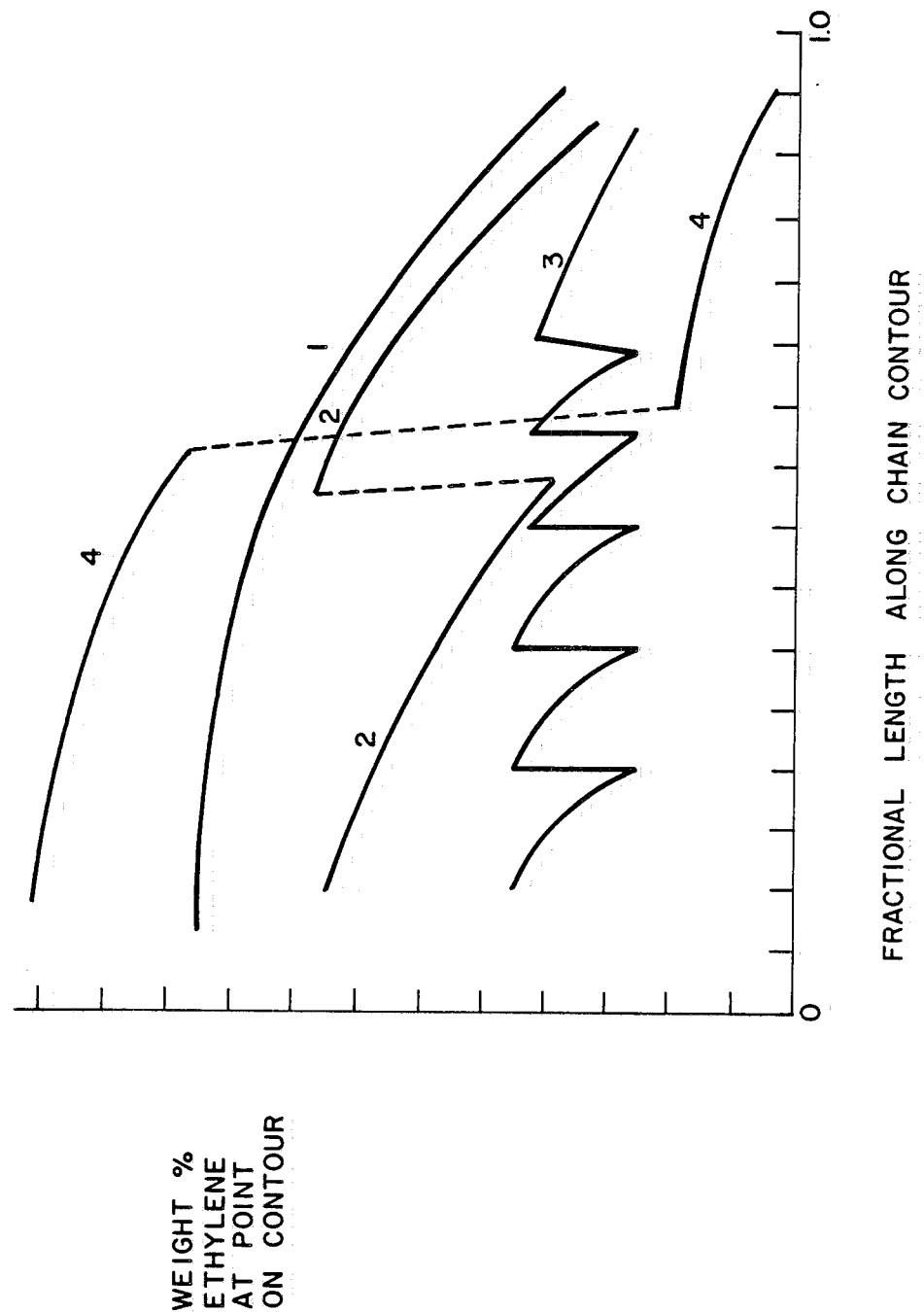

For example, various structures can be prepared by adding additional monomer(s) during the course of the polymerization, as shown in FIG. 4, wherein composition is plotted versus position along the contour length of the chain. The Intra-CD of cure 1 is obtained by feeding all of the monomers at the tubular reactor inlet or at the start of a batch reaction. In comparison, the Intra-CD of curve 2 can be made by adding additional ethylene at a point along the tube or, in a batch reactor, where the chains have reached about half their length. The Intra-CD's of Curve 3 requires multiple feed additions. The Intra-CD of curve 4 can be formed if additional comonomer rather than ethylene is added. This structure permits a whole ethylene composition range to be omitted from the chain. In each case, a third or more comonomers may be added.

The composition of the catalyst used to produce alpha-olefin copolymers has a profound effect on copolymer product properties such as compositional dispersity and MWD. The catalyst utilized in practicing processes in accodance with the present invention should be such as to yield essentially one active catalyst species in the reaction mixture. More specifically, it should yield a controlled number of species, each of which must be capable of simultaneous initiation. Additional active catalyst species could be present, provided the copolymer product is in accordance with the present invention, e.g., a superposition of components of narrow MWD. The extent to which a catalyst species contributes to the polymerization can be readily determined using the below-described techniques for characterizing catalyst according to the number of active catalyst species.

Techniques for characterizing catalyst according to the number of active catalyst species are within the skill of the art, as evidenced by an article entitled "Ethylene-Propylene Copolymers. Reactivity rations, Evaluation and Significance," C. Cozewith and G. Ver Strate, *Macromolecules*, 4, 482 (1971), which is incorporated herein by reference.

It is disclosed by the authors that copolymers made in a continuous flow stirred reactor should have an MWD characterized by $\overline{M}_w/\overline{M}_n = 2$ and a narrow Inter-CD when one active catalyst species is present. By a combination of fractionation and gel permeation chromatography (GPC) it is shown that for single active species catalysts the compositions of the fractions vary no more than ±3% about the average and the MWD (weight to number average ratio) for these samples approaches two (2). It is this latter characteristic ($M_w/M_n$ of about 2) that is deemed the more important in identifying a single active catalyst species. On the other hand, other catalysts gave copolymer with an Inter-CD greater than ±10% about the average and multi-modal MWD often with $M_w/M_n$ greater than 10. These other catalysts are deemed to have more than one active species.

Catalyst systems to be used in carrying out processes in accordance with the present invention may be Ziegler catalysts, which may typically include:

(a) a compound of a transition metal, i.e., a metal of Groups I-B, III-B, IVB, VB, VIB, VIIB and VIII of the Periodic Table, and (b) an organometal compound of a metal of Groups I-A, II-A, II-B and III-A of the Periodic Table.

The preferred catalyst system in practicing processes in accordance with the present invention comprises hydrocarbon-soluble vanadium compound in which the vanadium valence is 3 to 5 and organo-aluminum compound, with the proviso that the catalyst system yields essentially one active catalyst species as described above. At least one of the vanadium compound/organoaluminum pair selected must also contain a valence-bonded halogen.

In terms of formulas, vanadium compounds useful in practicing processes in accordance with the present invention could be:

where $x = 0-3$ and $R =$ a hydrocarbon radical;

$VCl_4$;
$VO(AcAc)_2$, where AcAc = acetyl acetonate;

$V(AcAc)_3$;

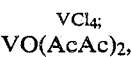

where $x = 1$ or 2; and

Where $n = 2-3$ and B = lewis base capable of making hydrocarbon-soluble complexes with $VCl_3$, such as tetrahydrofuran, 2-methyl-tetrahydrofuran and dimethyl pyridine.

In formula 1 above, R preferably represents a $C_1$ to $C_{10}$ aliphatic, alicyclic or aromatic hydrocarbon radical such as ethyl (Et), phenyl, isopropyl, butyl, propyl, n-butyl, i-butyl, t-butyl, hexyl, cyclohexyl, octyl, napthyl, etc. Non-limiting, illustrative examples of formula (1) and (2) compounds are vanadyl trihalides, alkoxy halides and alkoxides such as $VOCl_3$, $VOCl_2(OBu)$ where Bu = butyl, and $VO(OC_2H_5)_3$. The most preferred vanadium compounds are $VCl_4$, $VOCl_3$, and 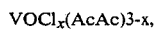.

As already noted, the co-catalyst is preferably organo-aluminum compound. In terms of chemical formulas, these compounds could be as follows:

| | |
|---|---|
| $AlR_3$, | $Al(OR')R_2$ |
| $Al\ R_2Cl$, | $R_2Al$—O—$AlR_2$ |
| $AlR'RCl$ | $AlR_2I$ |
| $Al_2R_3Cl_3$, | and |
| $AlRCl_2$, | | where R and R? represent hydrocarbon radicals, the same or different, as described above with respect to the vanadium compound formula. The most preferred organoaluminum compound is an aluminum alkyl sesquichloride such as $Al_2Et_3Cl_3$ or $Al_2(iBu)_3Cl_3$.

In terms of performance, a catalyst system comprised of $VCl_4$ and $Al_2R_3Cl_3$, preferably where R is ethyl, has been shown to be particularly effective. For best catalyst performance, the molar amounts of catalyst components added to the reaction mixture should provide a molar ratio of aluminum/vanadium (Al/V) of at least about 2. The preferred minimum Al/V is about 4. The maximum Al/V is based primarily on the considerations of catalyst expense and the desire to minimize the amount of chain transfer that may be caused by the organo-aluminum compound (as explained in detail below). Since, as is known certain organo-aluminum compounds act as chain transfer agents, if too much is present in the reaction mixture the $\overline{M}_w/\overline{M}_n$ of the copolymer may rise above 2. Based on these considerations, the maximum Al/V could be about 25, however, a maximum of about 17 is more preferred. The most preferred maximum is about 15.

Chain transfer agents for the Ziegler-catalyzed polymerization of alpha-olefins are well known and are illustrated, by way of example, by hydrogen or diethyl zinc for the production of EPM and EPDM. Such agents are very commonly used to control the molecular weight of EPM and EPDM produced in continuous flow stirred reactors. For the essentially single active species Ziegler catalyst systems used in accordance with the present invention, addition of chain transfer agents to a CFSTR reduces the polymer molecular weight but does not effect the molecular weight distribution. On the other hand, chain transfer reactions during tubular reactor polymerization in accordance with the present invention broaden polymer molecular weight distribution and Inter-CD. Thus the presence of chain transfer agents in the reaction mixture should be minimized or omitted altogether. Although difficult to generalize for all possible reactions, the amount of chain transfer agent used should be limited to those amounts that provide copolymer product in accordance with the desired limits as regards MWD and compositional dispersity. It is believed that the maximum amount of chain transfer agent present in the reaction mixture could be as high as about 0.2 mol/mol of transition metal, e.g., vanadium, again provided that the resulting copolymer product is in accordance with the desired limits as regards MWD and compositional dispersity. Even in the absence of added chain transfer agent, chain transfer reactions can occur because propylene and the organoaluminum cocatalyst can also act as chain transfer agents. In general, among the organo-aluminum compounds that in combination with the vanadium compound yield just one active species, the organoaluminum compound that gives the highest copolymer molecular weight at acceptable catalyst activity should be chosen. Furthermore, if the Al/V ratio has an effect on the molecular weight of copolymer product, that Al/V should be used which gives the highest molecular weight also at acceptable catalyst activity. Chain transfer with propylene can best be limited by avoiding excessive temperature during the polymerization as described below.

Molecular weight distribution and Inter-CD are also broadened by catalyst deactivation during the course of the polymerization which leads to termination of growing chains. It is well known that the vanadium based Ziegler catalyst used in accordance with the present invention are subject to such deactivation reactions which depend to an extent upon the composition of the catalyst. Although the relationship between active catalyst lifetime and catalyst system composition is not known at present, for any given catalyst, deactivation can be reduced by using the shortest residence time and lowest temperature in the reactor that will produce the desired monomer conversions.

Polymerizations in accordance with the present invention should be conducted in such a manner and under conditions sufficient to initiate propagation of essentially all copolymer chains for each particular $M_w$ mode simultaneously. This can be accomplished by utilizing the process steps and conditions described below.

The catalyst components are preferably premixed, that is, reacted to form active catalyst outside of the reactor, to ensure rapid chain initiation. Aging of the premixed catalyst system, that is, the time spent by the catalyst components (e.g., vanadium compound and organoaluminum) in each other's presence outside of the reactor, should preferably be kept within the limits. If not aged for a sufficient period of time, the components will not have reacted with each other sufficiently to yield an adequate quantity of active catalyst species, with the result of non-simultaneous chain initiation. Also, it is known that the activity of the catalyst species will decrease with time so that the aging must be kept below a maximum limit. It is believed that the minimum aging period, depending on such factors as concentration of catalyst components, temperature and mixing equipment, could be as low as about 0.1 second. The preferred minimum aging period is about 0.5 second, while the most preferred minimum aging period is about 1 second. While the maximum aging period could be higher, for the preferred vanadium/organo-aluminum catalyst system the preferred maximum is about 200 seconds. A more preferred maximum is about 100 seconds. The most preferred maximum aging period is about 50 seconds. The premixing could be performed at low temperature such as 40° C. or below. It is preferred that the premixing be performed at 25° C. or below, with 15° C. or below being most preferred.

Where more than one catalyst species is utilized each catalyst and cocatalyst should be premixed separately. The several premixed streams of catalysts species are then mixed immediately prior to mixing the catalyst species with the monomer feed. Alternately, the several pre-mixed catalyst feed streams can be fed to the same mixer where they are simultaneously blended with a solvent/monomer stream.

The temperature of the reaction mixture should also be kept with certain limits. The temperature at the reactor inlet should be high enough to provide complete, rapid chain initiation at the start of the polymerization reaction. The length of time the reaction mixture spends at high temperature must be short enough to minimize the amount of undesirable chain transfer and catalyst deactivation reactions.

Temperature control of the reaction mixture is complicated somewhat by the fact that the polymerization reaction generates large quantities of heat. This problem is, preferably, taken care of by using prechilled feed to the reactor to absorb the heat of polymerization. With this technique, the reactor is operated adiabatically and the temperature is allowed to increase during the course of polymerization. As an alternative to feed prechill, heat can be removed from the reaction mixture, for example, by a heat exchanger surrounding at least a portion of the reactor or by well-known autorefrigeration techniques in the case of batch reactors or multiple stirred reactors in series.

An adiabatic reactor operation is used, the inlet temperature of the reactor feed could be about from −50°; C. to 50° C. It is believed that the outlet temperature of the reaction mixture could be as high as about 200° C. The preferred maximum outlet temperature is about 70° C. The most preferred maximum is about 50° C. In the absence of reactor cooling, such as by a cooling jacket, to remove the heat of polymerization, it has been determined that the temperature of the reaction mixture will increase from reactor inlet to outlet by about 13° C. per weight percent of copolymer in the reaction mixture (weight of copolymer per weight of solvent).

Having the benefit of the above disclosure, it would be well within the skill of the art to determine the operating temperature conditions for making copolymer in accordance with the present invention. For example, assume an adiabatic reactor and an outlet temperature of 35° C. are desired for a reaction mixture containing 5% copolymer. The reaction mixture will increase in temperature by about 13° C. for each weight percent copolymer or 5 weight percent x 13° C./wt. % = 65° C. To maintain an outlet temperature of 35° C., it will thus require a feed that has been prechilled to 35° C.−65° C. = 30° C. In this instance that external cooling is used to absorb the heat of polymerization, the feed inlet temperature could be higher with the other temperature constraints described above otherwise being applicable.

Because of heat removal and reactor temperature limitations, the preferred maximum copolymer concentration at the reactor outlet is 25 wt./100 wt. diluent. The most preferred maximum concentration is 15 wt/100 wt. There is no lower limits to concentration due to reactor operability, but for economic reasons it is preferred to have a copolymer concentration of at least 2 wt/100 wt. Most preferred is a concentration of at least 3 wt/100 wt.

The rate of flow of the reaction mixture through the reactor should be high enough to provide good mixing of the reactants in the radial direction and minimize mixing in the axial direction. Good radial mixing is beneficial not only to both the Intra-and Inter-CD of the copolymer chains but also to minimize radial temperature gradients due to the heat generated by the polymerization reaction. Radial temperature gradients will tend to broaden the molecular weight distribution of the copolymer since the polymerization rate is faster in the high temperature regions resulting from poor heat dissipation. The artisan will recognize that achievement of these objectives is difficult in the case of highly viscous solutions. This problem can be overcome to some extent through the use of radial mixing devices such as static mixers (e.g., those produced by the Kenics Corporation).

It is believed that residence time of the reaction mixture in the mix-free reactor can vary over a wide range. It is believed that the minimum could be as low as about 1 second. A preferred minimum is about 10 seconds. The most preferred minimum is about 15 seconds. It is believed that the maximum could be as high as about 3600 seconds. A preferred maximum is about 1800 seconds. The most preferred maximum is about 900 seconds.

With reference to the accompanying drawings, particularly FIG. 1, reference numeral 1 generally refers to a premixing device for premixing the catalyst components. For purposes of illustration, it is assumed that a copolymer of ethylene and propylene (EPM) is to be produced using as catalyst components vanadium tetrachloride and ethyl aluminum sesqui chloride. The polymerization is an adiabatic, solution polymerization process using hexane solvent for both the catalyst system and the reaction mixture.

The premixing device 1 comprises a temperature control bath 2, a fluid flow conduit 3 and mixing device 4 (e.g., a mixing tee). To mixing device 4 are fed hexane solvent, vanadium tetrachloride and ethyl aluminum sesqui chloride through feed conduits 5, 6 and 7, respectively. Upon being mixed in mixing device 4, the resulting catalyst mixture is caused to flow within conduit 3, optionally in the form of a coiled tube, for a time long enough to produce the active catalyst species at the temperature set by the temperature bath. The temperature of the bath is set to give the desired catalyst solution temperature in conduit 3 at the outlet of the bath.

Upon leaving the premixing device, the catalyst solution flows through conduit 8 into mixing zone 9 to provide an intimate mixing with hexane solvent and reactants (ethylene and propylene) which are fed through conduit 10. Any suitable mixing device can be used, such as a mechanical mixer, orifice mixer or mixing tee. For economic reasons, the mixing tee is preferred. The residence time of the reaction mixture in mixing zone 9 is kept short enough to prevent significant polymer formation therein before being fed through conduit 11 to tubular reactor 12. Alternatively, streams 8 and 10 can be fed directly to the inlet of reactor 12 if the flow rates are high enough to accomplish the desired level of intimate mixing. The hexane with dissolved monomers may be cooled upstream of mixing zone 9 to provide the desired feed temperature at the reactor inlet.

The tubular reactor is shown with optional feed and take off points. Where the catalyst comprises only a single polymer species one or more take off points, 13, are used to withdraw polymer fractions at different points along the polymerization path. In order to maintain constant flow, additional solvent may be added to make up the volume of material withdrawn. Additional catalyst and monomer can be introduced through line, 14, or line, 15. The polymer withdrawn through line, 13, is combined with all other fractions withdrawn and collected with the reactor effluent for deashing and finishing.

Where more than one catalyst species is used, multiple premixing devices, 1, are used. The mixed catalyst can be directed to mixing zone, 9, for mixing with additional catalyst species and monomer or the effluent form the premixing devices can be combined prior to the mixing zone.

Where $VCL_4$ and $VOCl_3$ are used as the catalyst species in conjunction with ethylaluminum sesquichloride (EASC), the molar ratio of $VCl_4/VOCl_3$ can be about 0.10 to about 0.005, more preferably about 0.5 to about 0.02, most preferably about 3 to about 0.05. The amount of the total polymer and the molecular weight of each component will be determined by the ratio, and the feed locations and take off points along the reactor.

The molar ratio of alkyl aluminum sesquihalide to vanadium components ($VCl_4$ plus $VOCl_3$) can be about 1 to about 40, preferably about 2 to about 20, more preferably about 3 to about 10, e.g., about 5 to about 10. The alkyl group of the sesquihalide is preferably a $C_1$–$C_6$ alkyl group, preferably ethyl. The halide can be bromine, chlorine or iodine, preferably chlorine. The preferred aluminum co-catalyst is ethylaluminum sesquichloride (EASC). In this system the two independent, non-interacting, mutually compatible catalyst systems are $VCl_4$/EASC and $VOCl_3$/EASC.

In a preferred embodiment a Lewis base moderator is incorporated into the catalyst system. The molar ratio of $VCl_4$ to base can be about 0 to about 2/1, preferably about 1/1 to about 1.5/1, more preferably about 1/1 to about 1.2/1. Illustrative, non-limiting examples of lewis bases suitable for use in the practice of this invention are $NH_3$, phenol, cyclohexanone, tetrahydrofuran, acetylacetone and tri-n-butyl-phospine. The lewis base decreases the catalyst activity, and suppresses some long chain branching reactions.

The polymer derived from the process of this invention is deashed and finished using conventional methods. Where the polymodal MWD is achieved by withdrawing product and different points or times from the reactor, the polymer streams are preferably blended and a single deashing and finishing process used. The result is a thoroughly mixed polymer blend which is uniform with respect to its MWD. Alternately, each process stream can be finished independently and combined by mechanical mixing.

Having thus described the above illustrative reactor system, it will readily occur to the artisan that many variations can be made within the scope of the present invention. For example, the placement and number of multiple feed sites, the choice of temperature profile during polymerization and the concentrations of reactants can be varied to suit the end-use application.

By practicing processes in accordance with the present invention, alpha-olefin copolymers having polymodal MWD with each molecular weight fraction having very narrow MWD can be made by direct polymerization. Although narrow MWD copolymers can be made using other known techniques, such as by fractionation or mechanical degradation, these techniques are considered to be impractical to the extent of being unsuitable for commercial-scale operation. As regards EPDM made in accordance with the present invention, the products have enhanced cure properties at a given Mooney Viscosity.

A lubricating oil composition in accordance with the present invention comprises a major amount of basestock lubricating oil (lube oil) of lubricating viscosity which contains an effective amount of viscosity index improved being a copolymer of ethylene and at least one other alpha-olefin as described in detail above. More specifically, the copolymer should have a MWD characterized by at least one of a ratio of $\overline{M}_w/\overline{M}_n$ of less than 2 and a ratio of $\overline{M}_z/\overline{M}_w$ of less than 1.8. The preferred ration of $\overline{M}_w/\overline{M}_n$ is less than about 1.6, with less than about 1.4 being preferred. The preferred $\overline{M}_z/\overline{M}_w$ is less than about 1.5, with less than about 1.3 being most preferred.

In a preferred embodiment of this invention, the Intra-CD of the copolymer is such that at least two portions of an individual intra-molecularly heterogeneous chain, each portion comprising at least 5 wt % of said chain, differ in composition from one another by at least 5 wt % ethylene. The Intra-CD can be such that at least two portions of copolymer chain differ by at least 10 wt % ethylene. Differences of at least 20 wt %, as well as 40 wt %, ethylene are also considered to be in accordance with the present invention.

In such an embodiment, it is preferred that th Inter-CD of the copolymer is such that 95 wt % of the copolymer chains have an ethylene composition that differs from the copolymer average wt % ethylene composition by 15 wt % or less. The preferred Inter-CD is about 13% or less, with the most preferred being about 10% or less.

With reference to processes for making copolymer in accordance with the present invention, it is well known that certain combinations of vanadium and aluminum compounds that can comprise the catalyst system can cause branching and gelation during the polymerization for polymers containing high levels of diene. To prevent this from happening Lewis bases such as ammonia, tetrahydrofuran, pyridine, tributylamine, tetrahydrothiophene, etc., can be added to the polymerization system using techniques well known to those skilled in the art.

Where the polymodal molecular weight distribution is achieved by withdrawing polymer fractions from the reactor, it will be evident from reference to this disclosure that whether a tubular reactor or batch reactor is used, that time is the critical parameter for determining when or where to withdraw polymer from the reaction zone and can be determined without undue experimentation. For example, a pilot plant scale tubular reactor can be equipped with a multiplicity of take off points. By running the reactor with withdrawing polymer from the system the base case is determined to fix the molecular weight of the polymer for the full reaction time to be used.

A series of runs can then be made, withdrawing polymer from the tubular reactor, a different point along the tube for each run. By converting the distance along the tube to time of reaction after introduction of catalyst, a plot can be made of molecular weight as a function of reaction time for a given catalyst/monomer/solvent system. In sealing up the reactor for commercial operations, there will be a 1 to 1 relationship in scale up as to time. Hence, although the reactor will be longer, the total reaction time will be the same; only the stream volume and velocity will be different. The molecular weight/reaction time plot can be used to position take off points. For flexibility in selecting the product characteristics of a particular polymodal MWD product, a multiplicity of take off points can be installed, not all of which will be used in preparing a particular product with predetermined specifications.

Similarly, inlet ports can be located at different locations for the introduction of additional monomer or catalyst streams. By introducing fresh monomer downstream of the inlet, the MWD of the polymer will be modified. So long as the polymerization is carried out in this manner the polymer will be a polymodal MWD polymer of narrow MWD fractions. Similar results are achieved by introducing fresh premixed catalyst with the additional monomer feed.

The advantages of the instant invention may be more readily appreciated by reference to the following examples.

It will be evident from this disclosure to those skilled in the art that the polymodal MWD polymers of this invention can be prepared by blending the product of runs prepared under different conditions or using different catalyst. For example, one polymerization can be conducted using $VCl_4$/EASC as the catalyst and another conducted using $VOCl_3$/EASC as the catalyst.

The product of the two runs can then be blended to form a bimodal MWD polymer blend. Other variations can be used to generate polymer species of different $\overline{M}_w$ to prepare polymodal MWD compositions.

EXAMPLE I

This example illustrates the method of this invention for preparing an EPM wherein polymer product is removed from the reactor at a point intermediate between the reactor inlet and outlet. The polymerization reactor was a one-inch diameter pipe equipped with Keniis static mixer elements along its length. The polymerization was conducted so that the residence time in the reactor was 56 seconds. A take off port was located downstream of the inlet at a distance equivalent to 20 seconds residence time.

Hexane was used as the solvent, $VCl_4$ as the catalyst, and $Al_2Et_3Cl_3$ as the cocatalyst. Hexane is purified prior to use by passing over 4A molecular sieves (Union Carbide, Linde Div. 4A 1/16" pellets) and silica gel (W. R. Grace Co., Davidson Chemical Div., PA-400 20-4 mesh) to remove polar impurities which act as catalyst poisons. Gaseous, ethylene and propylene is passed over hot (270° C.) CuO (Harshaw Chemical Co., CO1900 ¼'" spheres) to remove oxygen followed by mal sieve treatment for water removal and then combined with hexane upstream of the reactor and passed through a chiller which provided a low enough temperature to completely dissolve the monomers in the hexane.

A catalyst solution is prepared by dissolving 18.5 g of vanadium tetrachloride, $VCl_4$, in 5.0 l. of purified n-hexane. The cocatalyst consists of 142 g of ethylaluminum sesquichloride, $Al_2Et_3Cl_3$, in 5.0 l. of purified hexane. The two solutions are premixed at 0° C. for ten seconds. Typical feed rates and reacting conditions are shown in Table I.

TABLE I

| Reactor Inlet Temperature (°C.) | −10 |
|---|---|
| Reactor Outlet Temperature (°C.) | 0 |
| Reactor Feed Rates | |
| Hexane (Kg/hr) | 60.3 |
| Ethylene (kg/hr) | 0.22 |
| Porpylene (kg/hr) | 2.0 |
| $VCl_4$ (g/hr) | 2.22 |
| $Al_2Et_3Cl_3$ (g/hr) | 17 |
| Catalyst Premixing Temperature (°C.) | 0 |
| Catalyst Premixing Time (sec) | 10 |
| Reactor Residence Time (sec) | 56* |

*Steady state residence time with no take off is 50 seconds.

The reactor is allowed to reach steady state and a product stream is then withdrawn from the take off port at about 17 kg/hr. The system is again allowed to reach steady state and effluent from the take off port (ca. 1.71 kg/hr) is collected and blended with effluent from the reactor outlet (ca. 6.83 kg/hr). The product is deashed and stripped. The resulting polymer is an EPM with a bimodal MWD.

EXAMPLE II

Example I is repeated except that no effluent is taken from the take off port and $VOCl_3/EASC$ is used as an additional catalyst.

The second catalyst solution is prepared by dissolving 18.5 g of $VOCl_3$ in 5.0 l. of purified hexane. The cocatalyst consists of 142 g of $Al_2Et_3Cl_3$ in 5.0 l. of purified hexane. The $VCl_4$ and $VOCl_3$ are blended with cocatalysts in separate premixing units. The two premixed catalyst streams are then mixed with the monomer/hexane stream and fed into the reactor. Reactor residence time is 50 seconds. Otherwise all conditions are the same as in Example I. After steady state is achieved, the reactor effluent is deashed, washed and stripped of solvent. The resulting polymer is a bimodal MWD EPM.

EXAMPLE III

Example I is repeated except that no take off port effluent is collected and the catalyst and feed streams are split. About ⅔ of the monomer/hexane stream and ⅔ of the premixed catalyst are mixed and fed to the reactor inlet and the remaining ⅓ of the monomer/hexane feed is mixed with the remaining catalyst stream and fed into the reactor at a point midway between the reactor inlet and outlet. The EPM product is a polymodal MWD polymer.

What is claimed is:

1. A method for preparing a polymodal MWD ethylene copolymer which comprises:
   (a) conducting the polymerization in a substantially mix free reactor;
   (b) using at least two catalyst species each of which initiates a polymer chain of a different molecular weight than the other catalyst species;
   (c) using at least one reaction mixture comprising ethylene and at least one alpha-olefin monomer, said reaction mixture being essentially transfer-agent free;
   (d) in such a manner and under such conditions sufficient to initiate propagation of essentially all copolymer chains simultaneously; the resulting polymer comprising at least two modes of differing molecular weights, each mode having at least one of $\overline{M}_w/\overline{M}_n$ of less than 2 and $\overline{M}_z/\overline{M}_w$ of less than 1.8, the resulting polymer being a polymodal MWD ethylene copolymer.

2. The process according to claim 1 wherein each catalyst species comprises a hydrocarbon-soluble vanadium compound and an organo-aluminum compound which react to form essentially one active catalyst species, at least one of the vanadium compound and organo aluminum compound containing a valence-bonded halogen.

3. The process according to claim 2 wherein each catalyst species comprises:
   (a) hydrocarbon-soluble vanadium compound selected from the group consisting of:

where $x=0-3$ and $R=$ hydrocarbon radical;

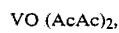

where $AcAc=$ acetyl acetonate

where $AcAc=$ acetyl acetonate

where $AcAc=$ acetyl acetonate

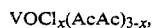

where $x=1$ or 2 and $AcAc=$ acetyl acetonate; and

VCl₃.nB, where n=2–3 and B=Lewis base capable of forming hydrocarbon-soluble complexes with VCl₃; and
(b) organo-aluminum compound selected from the group consisting of:

AlR₃

AlR₂Cl,

Al₂R₃Cl₃,

AlRCl₂,

AlR'RCl,

Al(OR')R₂,

R₂Al-OAlR₂, and

AlR₂I, where R and R' are hydrocarbon radicals.

4. The process according to claim 3 wherein a first catalyst species comprises VCl₄ as the catalyst and Al₂R₃Cl₃ as the cocatalyst and a second catalyst species comprises VOCl₃ as the catalyst and Al₂R₄Cl₃ as the cocatalyst where R is hydrocarbyl.

5. The process according to claim 4 wherein R is ethyl.

6. The process according to claim 1 wherein the reactor is a mix free reactor.

7. The process according to claim 6 wherein the reactor is a tubular reactor.

8. The process according to claim 1 wherein the reactor is a limited discrete mix free reactor.

9. The process according to claim 1 wherein the reactor comprises an inlet and an outlet, and wherein the temperature of the reaction mixture at the reactor inlet is about −50° C. to 150° C.

10. The process according to claim 9 wherein the maximum temperature of the reaction mixture at the reactor outlet is about 200° C.

11. The process according to claim 3 wherein the catalyst components are premixed, and wherein the polymerization is a solution polymerization.

12. The process according to claim 11 wherein the catalyst components are aged for at least 0.5 second.

13. The process according to claim 2 wherein the mole ratio of aluminum to vanadium in the catalyst is about 2 to 25.

14. The process according to claim 11 wherein the reaction mixture leaving the reactor has a copolymer concentration of about 3 to 15% on a weight copolymer per weight of solvent basis.

15. The process according to claim 1 wherein the catalyst comprises a Ziegler catalyst.

16. The process according to claim 10 wherein the maximum outlet temperature of the reaction mixture is about 50° C.

17. The process according to claim 12 wherein the catalyst comprises components that are premixed and then aged for about 1 to 50 seconds.

18. The process according to claim 12 wherein the mole ratio of aluminum to vanadium in the catalyst is about 4 to 15.

19. The process according to claim 18 wherein the polymerization is conducted in a solvent for the reaction mixture, and wherein the reaction mixture leaving the reactor has a copolymer concentration of about 3% to 10% on a weight of polymer per weight of solvent basis.

20. The process according to claim 10 wherein the maximum outlet temperature of the reaction mixture is about 70° C.

21. The process according to claim 1 wherein the polymerization is adiabatic.

22. The process according to claim 21 wherein one of the active catalyst species provided for at least 65% of the total copolymer produced.

23. The process according to claim 22 which is continuous and is conducted in hexane solvent.

24. The process according to claim 1 wherein the mix-free reactor is a tubular reactor and said reaction mixture further comprises diene, and wherein at least one of said ethylene, other alpha-olefin monomer and diene are fed to said tubular reactor at multiple feed sites.

* * * * *